United States Patent [19]
Bolenbaugh

[11] 3,893,548
[45] July 8, 1975

[54] APPLICATION ADJUSTER FOR DRUM BRAKE

[75] Inventor: Daniel L. Bolenbaugh, South Bend, Ind.

[73] Assignee: The Bendix Corporation, South Bend, Ind.

[22] Filed: Mar. 11, 1974

[21] Appl. No.: 450,116

[52] U.S. Cl..................... 188/79.5 GC; 188/196 BA
[51] Int. Cl............................................. F16d 51/52
[58] Field of Search... 188/79.5 B, 79.5 P, 79.5 GC, 188/196 F, 196 BA

[56] References Cited
UNITED STATES PATENTS
3,103,992  9/1963  Dombeck.................... 188/79.5 GC

*Primary Examiner*—Duane A. Reger
*Attorney, Agent, or Firm*—Ken C. Decker; William N. Antonis

[57] ABSTRACT

A drum brake is disclosed which includes an adjusting mechanism which effects brake adjustment upon application of the brake upon a predetermined amount of lining wear. The adjusting mechanism includes a cable which is connected to one of the brake shoes and to a fixed portion of the brake, and which is also connected to a spring which extends between the conventional adjuster lever mounted on one of the brake shoes and the other shoe. An overtravel connection is provided between the spring and the lever, so that when braking forces are such that adjustment cannot be effected, damage to the adjusting mechanism is minimized.

11 Claims, 3 Drawing Figures

3,893,548

APPLICATION ADJUSTER FOR DRUM BRAKE

BACKGROUND OF THE INVENTION

This invention relates to an application brake adjuster for the drum brake.

In general, two types of brake adjusting mechanisms are available to effect automatic adjustments of drum brakes. The first type, such as that disclosed in U.S. Pat. No. 2,938,610 effects adjustment upon release of the brake and has the advantage of relative simplicity and is consequently low in cost. The other type of adjuster, which effects adjustment upon application of the brake, is of the general type disclosed in U.S. Pat. Nos. 3,216,533; 3,034,603; and 3,034,602. Application adjusters of this type have the advantage of permitting tighter running clearance between the brake shoes and the drum but suffer the disadvantage of being relatively more expensive than release adjusters, since application adjusters require several additional spring members, including a relatively expensive overtravel spring which is necessary to prevent damage to the adjusting mechanism when a brake adjustment is attempted when braking forces are such that the adjustment cannot be made. Of course, it will be realized by those skilled in the art that both application and release adjusters effect brake adjustment only when the vehicle is backing up.

SUMMARY OF THE INVENTION

Therefore, an important object of this invention is to provide an application adjuster for a drum brake which is cost competitive with existing release adjusters.

Another important object of our invention is to provide an application adjuster for drum brakes which require fewer parts than do existing application adjusters.

Still another important object of our invention is to provide an automatic application adjuster for drum brakes which eliminates the overtravel spring required in prior art application adjusters.

A still further object of our invention is to provide an application brake adjuster for a drum brake in which a single spring holds the shoes and adjusting strut together, returns the adjusting lever to its normal position after a brake adjustment is effected, creates a downward load on the adjuster lever to hold it against the starwheel, and which eliminates the need for an overtravel spring.

DETAILED DESCRIPTION

Figure 1:
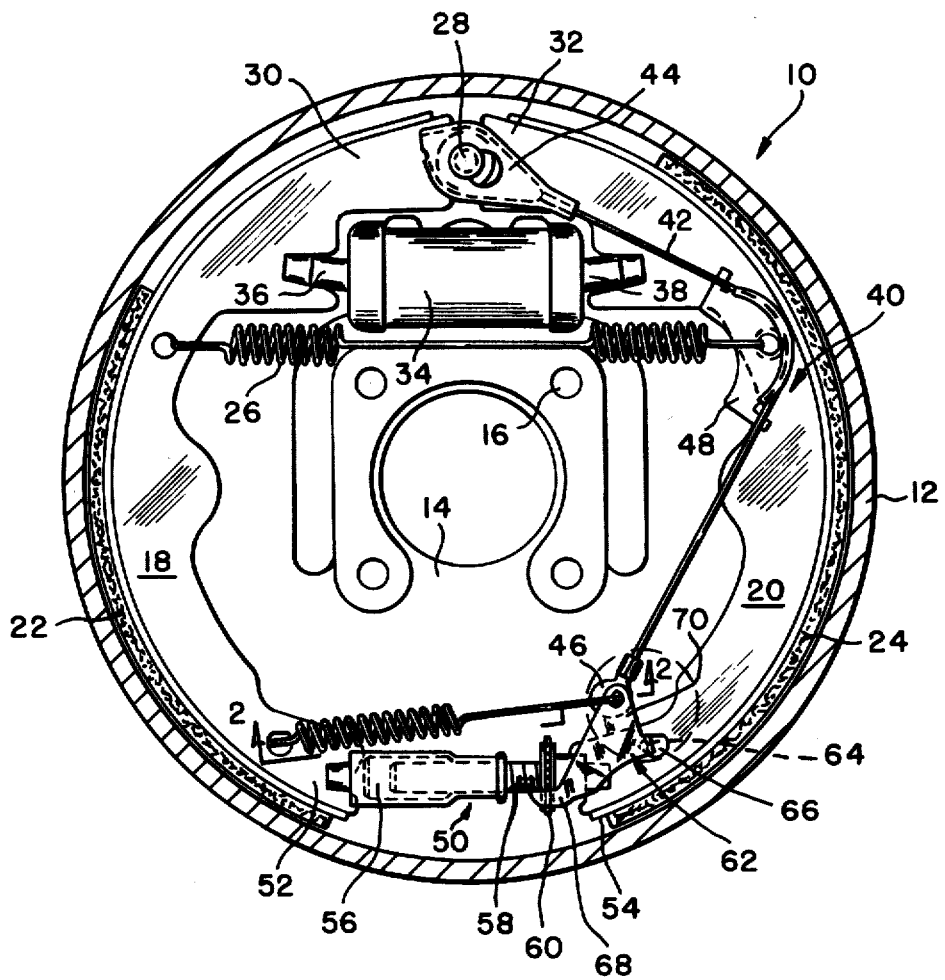
FIG. 1 is a side elevational view of a drum brake having an application adjuster made pursuant to the teachings of our present invention.
Figure 2:
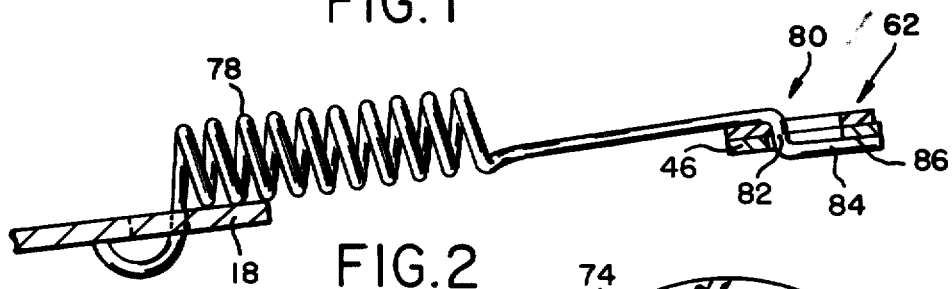
FIG. 2 is a view taken substantially along line 2-2 of FIG. 1.

Referring now to the drawings, a drum brake generally indicated by the numeral 10 includes a drum 12 which is mounted for rotation with the vehicle wheel. The stationary torque member or backing plate 14 is rigidly mounted to a nonrotative portion of the vehicle by bolts (not shown) inserted through apertures 16 in the backing plate 14. A pair of brake shoes 18, 20 are slidably mounted on the backing plate 14 for movement toward and away from the drum 12. Brake shoes 18, 20 are conventional having a T-type cross-section and are extremely well known to those skilled in the art, having been widely used in this country for many years. Each of the brake shoes 18 and 20 include friction material 22, 24 carried thereon which is adapted to engage the drum 12 when a brake application is effected. A return spring 26 extends between the shoes 18 and 20, yieldably urging the shoes away from the drum 12. An anchor pin 28 is provided between contiguous ends 30, 32 of the shoes 18 and 20, respectively, and the return spring 26 normally urges the ends 30, 32 into engagement with the pin 28 when the brake is released.

A fluid motor 34 is secured to the backing plate 14 and includes a pair of connecting links 36, 38 which interconnect the fluid motor 34 with the brake shoes 18, 20. The fluid motor 34 is conventional wheel cylinder well known to those skilled in the art, has been used on drum brakes manufactured in the United States for many years. Of course, the fluid motor 34 is connected to the vehicle's master cylinder so that pressure generated in the master cylinder on initiation of a brake application is transmitted to the fluid motor 34, to actuate links 36, 38 to urge the brake shoes 18, 20 into braking engagement with the drum 12.

Brake 10 further includes an adjusting mechanism generally indicated by the numeral 40. Mechanism 40 includes a flexible cable 42 having a fixture 44 on one end thereof which is adapted for connection with the anchor pin 28 and another fixture 46 on the other end thereof. A cable guide 48 is rigidly secured to the brake shoe 20, and the cable 42 is threaded around the cable guide 48, so that upon movement of the shoe 20 during a brake application, the cable 42 will be carried with the shoe 20. Adjusting mechanism 40 further includes an adjusting strut 50 which is located between contiguous ends 52, 54 of the brake shoes 18, 20. Adjusting strut 50 includes a nut 56 which is engaged with the end 52 of the shoe 18 and a screw 58 which is engaged with the end 54 of the shoe 20. Since the screw 58 is threadedly engaged with the nut 56, the rotation of the screw 58 relative to the nut 56 will extend the screw from the nut, thereby separating the ends 52, 54 of the brake shoes 18, 20 an additional amount so that the brake shoes will thereafter be disposed in closer proximity to the brake drum 12. Rotation of the screw 58 is accomplished by a serrated starwheel 60 which is rigid with the nut 58. The starwheel 60 is of the conventional type well known to those skilled in the art, and the serrations on the starwheel 60 are adapted to engage an actuated member to effect rotation of the starwheel 60.

Figure 3:
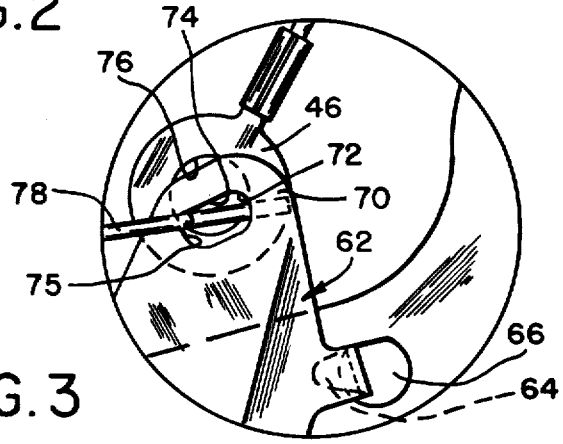
FIG. 3 is an enlarged view of the circumscribed portion of FIG. 1.

Adjuster mechanism 40 further comprises adjuster lever generally indicated by the numeral 62. The adjuster lever 62 is provided with a tab 64 bent transversely to the body of the adjuster lever 62. Tab 64 is received within an opening 66 provided in the web of the brake shoe 20, to thereby pivotally mount the adjuster lever 62 on the brake shoe 20. Adjuster lever 62 further comprises a finger 68 which engages the serrations of the starwheel 60. The upper portion 70 of the adjusting lever 62 is provided with an elongated opening 72 having a relatively flat edge 74 which cooperates with substantially perpendicular edge 75 of opening 72 to define a relatively sharp corner therebetween. The opening 72 at least partially overlaps a substantially annular opening 76 in the fixture 46. One end of a relatively heavy coiled spring 78 is engaged with the web of the brake shoe 18, and the other end of the spring 78 terminates in a hooked portion 80 which is engaged with the fixture 46 and the lever 62. Hooked portion 80 includes a section 82 which extends transversely in respect to the axis of the spring 78, and a second section 84 extending from the section 82 generally parallel with the axis of the spring 78. The section 82 extends first through the opening 74 of the lever 62, and then through the opening 76 in the fixture 46. As is most clearly illustrated in FIG. 3, transversely extending section 82 normally engages the sharp corner defined between edges 74 and 75 of opening 72 and normally alerts both edges 74 and 75 during normal functioning of the adjuster mechanism. The length of the section 84 is sufficiently long such that it engages the surface 86 of the fixture 46, to thereby prevent the spring 78 from being accidently dislodged from the fixture 46 and from the adjuster lever 62. It will be noted that there is no direct, force transmitting connection between the fixture 46 and adjuster lever 62; all forces are transmitted from the fixture 46 to the lever 62 through the hooked portion 80 of the spring 78. It will further be noted that since the periphery of the starwheel 60 extends above the plane of the web of the brake shoes 18, 20, and since the adjuster lever 62 is substantially flat and is pivotally connected to the web of the shoe 20, the connection of the spring 78 between the adjuster lever 62 and the brake shoe 18 will tend to generate a force yieldably urging the finger 68 against the serrations of the starwheel 60. Similarly, the end of the spring 78 is attached to the brake shoe 18 in such a position that it generates a force tending to rotate the lever 62 in a counterclockwise direction. This force is opposed by the cable 42 so that the spring 78 yieldably urges the adjusting lever 62 towards some predetermined nominal position. Furthermore, since the spring 78 is directly connected to the brake shoe 18 and indirectly connected to the brake shoe 20 through the adjuster lever 62, the spring 78 also generates a force tending to maintain engagement of the ends 52, 54 of the brake shoes 18, 20 with the adjusting strut 50.

MODE OF OPERATION

When a brake application is effected, pressure generated in the vehicle's master cylinder transmitted to fluid motor 34 acts through connecting links 36, 38 to urge the brake shoes 18, 20 into frictional engagement with the drum 12, thereby retarding rotation of the latter. Thus the brake shoe 20 moves toward the drum 12. Cable guide 48 is, of course, carried with the brake shoe 20. Since the cable 42 is threaded around the cable guide 48, the portion of the cable 42 between the cable guide 48 and the anchor pin 28 will elongate and the portion of the cable 42 between the cable guide 48 and the fixture 46 will be foreshortened, thereby generating a force acting through the fixture 46 and the hooked portion 80 of the spring 78 tending to rotate the adjuster lever 62 in a clockwise direction, viewing FIG. 1. If wear of the friction material 22, 24 is such that movement of the brake shoes 18, 20 toward the drum 12 is sufficient to cause rotation of the lever 62 an amount sufficient to cause the finger 68 to engage one of the serrations on the starwheel 60, any additional amount of rotation of the lever 62 will rotate the starwheel 60 in a manner well known to those skilled in the art, thereby rotating the adjusting screw 58 to effect adjustment of the brake by increasing the distance between the brake shoes 18, 20. Therefore, upon release of the brakes, the brake shoes 18, 20 will move back a smaller distance from the drum 12 as compared with the initial position of shoes 18, 20. This distance is governed by the length of the adjusting strut 50. After the brake is released, spring 78 exerts a force on the adjuster lever 62 tending to rotate the latter in a counterclockwise direction, towards its nominal position.

During normal actuation of the brake, when relatively low pressures are generated in the vehicle's master cylinder, the adjusting mechanism 40 operates substantially as described in the preceding paragraph. However, there are circumstances, such as when an extremely large actuating force is generated during a so-called "panic" stop, that the actuating forces applied to brake shoes 18, 20 may be sufficiently great that they lock the adjuster screw 58 against rotation relative to the adjuster nut 56. If an adjustment is effected by the adjusting lever 62 during such a brake application, the adjusting lever 62 may be severely damaged or bent, thereby rendering the entire adjusting mechanism 40 inoperable on subsequent brake actuations. For this reason, it has been conventional to employ an overtravel spring in the cable 42, such that, when the forces exerted during a brake application are sufficiently great, the forces on the adjusting lever 62 would be relieved. In the present invention, the spring 78 serves as the overtravel spring. It will be noted that, as pointed out hereinabove, there is no direct force transmitting connection between the fixture 46 and the adjuster lever 62, and that instead all forces applied to the adjuster lever 62 from the fixture 46 are applied to the spring 80. In case the brake actuating forces are sufficiently great to lock the adjuster strut 50, the fixture 46 will slide the hooked portion 80 of the spring 78 along the flat portion 74 of the opening 72 in the adjuster lever 62, thereby providing an overtravel connection between the spring 78, the fixture 46, and the adjuster 62 which prevents damage to the brake. It will be noted that the angle of the straight edge 74 will govern the initial force which must be applied to the hooked portion 80 of the spring 78 in order to initiate the aforementioned sliding action along this straight edge 74.

I claim:

1. In a drum brake, a backing plate for mounting on a non-rotative portion of a vehicle, a drum mounted for rotation with a member to be braked, a pair of brake shoes slidably mounted on said backing plate in end-to-end relationship, fluid motor means for urging said brake shoes into frictional engagement with said drum, resilient means yieldably urging said brake shoes away from said drum, an extendible adjusting strut between contiguous ends of said shoes, said adjusting strut including a starwheel for extending said strut upon rotation of the starwheel, an adjusting lever pivotally mounted on one of said shoes adjacent said starwheel for rotating the latter upon pivoting of the lever, wherein the invention comprises a spring extending between said adjusting lever and the other brake shoe, and a force transmitting member interconnecting the spring, the shoe, and the backing plate of the brake whereby upon movement of the shoe toward the drum in excess of a predetermined amount an actuating force is transmitted through said spring to pivot said lever as the brake is applied thereby effecting adjustment of the brake, and an overtravel connection between said spring and said lever to permit movement of the spring relative to the lever when the adjuster lever is prevented from moving.

2. The invention of claim 1:

said overtravel connection comprising an aperture in said lever receiving the end of the spring, the aperture being oriented such that the end of the spring slides along the edge of the slot when forces greater than a predetermined magnitude are transmitted through said force transmitting member.

3. The invention of claim 2:

said force transmitting member being connected to said spring at said one end of the latter.

4. The invention of claim 3:

said force transmitting member being a flexible cable, a fixture on the end of said cable having an aperture overlapping the aperture in said lever, the end of said spring extending through the apertures in said fixture and on said lever.

5. The invention of claim 4:

said one end of said spring terminating in a hooked portion including a first section extending transversely to the axis of the spring and a second section extending from said first section parallel to the axis of the spring, said first section extending through each of said apertures.

6. In a drum brake, a backing plate for mounting on a non-rotative portion of a vehicle, a drum mounted for rotation with a member to be braked, a pair of brake shoes slidably mounted on said backing plate in end-to-end relationship, fluid motor means for urging said brake shoes into frictional engagement with said drum, resilient means yieldably urging said brake shoes away from said drum, an extendible adjusting strut between contiguous ends of said shoes, said adjusting strut including a starwheel for extending said strut upon rotation of the starwheel, an adjusting lever pivotally mounted on one of said shoes adjacent said starwheel for rotating the latter upon pivoting of the lever, wherein the invention comprises a spring extending between said adjusting lever and the other brake shoe, and a force transmitting member interconnecting the spring, the shoe, and the backing plate of the brake whereby upon movement of the shoe toward the drum in excess of a predetermined amount an actuating force is transmitted through said spring to pivot said lever as the brake is applied thereby effecting adjustment of the brake;

said force transmitting member and said lever having apertures therein, the end of said spring extending through the apertures in said force transmitting member and in said lever.

7. The invention of claim 6:

said one end of said spring terminating in a hooked portion including a first section extending transversely to the axis of the spring and a second section extending from said first section parallel to the axis of the spring, said first section extending through each of said apertures.

8. The invention of claim 7:

the length of said second section being longer than the width of said apertures, whereby said second section retains the spring on the lever and said force transmitting member.

9. The invention of claim 6, said aperture in said lever having a pair of edges defining a relatively sharp corner therebetween, said end of said spring engaging said sharp corner during normal operation of the brake.

10. The invention of claim 9, one of said edges of the aperture in said lever being relatively flat, said one end of the spring being urged along said flat edge relative to said lever when the latter is prevented from moving.

11. The invention of claim 10, said one end of said spring terminating in a hooked portion engaging the apertures in said lever and in said force transmitting member.

* * * * *